United States Patent
Zhong (10) Patent No.: US 10,725,692 B2
(45) Date of Patent: Jul. 28, 2020

(54) DATA STORAGE METHOD AND APPARATUS

(71) Applicant: Huawei Technologies Co., Ltd., Shenzhen, Guangdong (CN)

(72) Inventor: Yanhui Zhong, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/232,815

(22) Filed: Dec. 26, 2018

(65) Prior Publication Data

US 2019/0129649 A1 May 2, 2019

Related U.S. Application Data

(63) Continuation of application No. PCT/CN2017/072080, filed on Jan. 22, 2017.

(30) Foreign Application Priority Data

Jun. 28, 2016 (CN) .......................... 2016 1 0481388

(51) Int. Cl.
  *G06F 3/06* (2006.01)
  *G06F 12/00* (2006.01)
  *G06F 11/10* (2006.01)

(52) U.S. Cl.
  CPC .......... *G06F 3/0655* (2013.01); *G06F 3/0604* (2013.01); *G06F 3/067* (2013.01); *G06F 11/1076* (2013.01)

(58) Field of Classification Search
  CPC ...... G06F 3/0655; G06F 3/0604; G06F 3/067; G06F 11/1076; G06F 12/00; G06F 13/00
  USPC ........................................... 711/100, 154, 200
  See application file for complete search history.

(56) References Cited

U.S. PATENT DOCUMENTS

| | | | |
|---|---|---|---|
| 9,003,144 B1 * | 4/2015 | Hayes ................. | G06F 11/2069 711/162 |
| 2013/0036289 A1 | 2/2013 | Welnicki et al. | |
| 2013/0067294 A1 | 3/2013 | Flynn et al. | |
| 2016/0041887 A1 * | 2/2016 | Davis .................... | G06F 3/0619 714/6.2 |
| 2016/0246528 A1 * | 8/2016 | Colgrove .............. | G06F 3/0622 |

FOREIGN PATENT DOCUMENTS

| | | |
|---|---|---|
| CN | 102279777 A | 12/2011 |
| CN | 103535014 A | 1/2014 |
| CN | 103699494 A | 4/2014 |
| CN | 104331254 A | 2/2015 |
| CN | 105573680 A | 5/2016 |
| CN | 106201338 A | 12/2016 |
| EP | 2787446 B1 | 10/2017 |
| WO | 2014121593 A1 | 8/2014 |

* cited by examiner

*Primary Examiner* — Tuan V Thai
(74) *Attorney, Agent, or Firm* — Womble Bond Dickinson (US) LLP (57) ABSTRACT

A data storage method and an apparatus are provided in a distributed storage system including a computing node and a plurality of storage nodes. The computing node writes the N data slices and the M check slices into the R storage nodes in each storage node group to improve reliability and stability of data in a data center.

12 Claims, 6 Drawing Sheets

DATA STORAGE METHOD AND APPARATUS

CROSS-REFERENCE TO RELATED APPLICATIONS

This application is a continuation of International Application No. PCT/CN2017/072080, filed on Jan. 22, 2017, which claims priority to Chinese Patent Application No. 201610481388.0, filed on Jun. 28, 2016. The disclosures of the aforementioned applications are hereby incorporated by reference in their entireties.

TECHNICAL FIELD

The present disclosure relates to the field of data storage technologies, and in particular, to a data storage method and an apparatus.

BACKGROUND

With development of cloud computing and big data, an increasing quantity of enterprises process applications, data, and systems together. However, the enterprises are confronted with risks when data is centralized, and when a disaster occurs, how to ensure service continuity of a core service of an enterprise for 7×24 hours becomes a concern in the industry. To resolve the problem, enterprises start to use an "active-active data center".

Specifically, in the active-active data center, when writing data into a storage node in a first data center, a computing node in the first data center further sends the data to a computing node in a second data center, and the computing node in the second data center writes the data into a storage node in the second data center, so as to implement active-active data access in the active-active data center.

However, when data fails to be written into any data center in the foregoing active-active data center, the data center loses an active-active feature.

SUMMARY

Embodiments of the present disclosure provide a data storage method and an apparatus, so as to improve active-active stability of a data center.

According to a first aspect, an embodiment of the present disclosure provides a data storage method, applied to a distributed storage system, and the distributed storage system includes a computing node and a plurality of storage nodes. The method includes: receiving, by the computing node, a data storage request, where the data storage request includes to-be-stored data; determining, by the computing node, a hash partition that stores the to-be-stored data, where the hash partition includes a first storage node group and a second storage node group, the first storage node group includes R storage nodes that belong to a first data center, the second storage node group includes R storage nodes that belong to a second data center, and R is an integer greater than 2; dividing, by the computing node, the to-be-stored data into N data slices, and obtaining M check slices of the N data slices, where N and M are positive integers, and N+M=R; and separately writing, by the computing node, the N data slices and the M check slices into the R storage nodes in the first storage node group and the R storage nodes in the second storage node group.

In this embodiment of the present disclosure, a first part of storage nodes in the plurality of storage nodes belong to the first data center, and a second part of storage nodes belong to the second data center. The storage nodes in the first data center and the second data center are grouped based on a fault tolerance level of the distributed storage system, storage node groups in the first data center are in a one-to-one correspondence with storage node groups in the second data center, so as to determine a plurality of hash partitions, and each group includes R (R is corresponding to the fault tolerance level) storage nodes. In this embodiment of the present disclosure, the to-be-stored data is stored in two storage node groups in a same partition based on the fault tolerance level, and the storage node groups are located in different data centers, thereby improving reliability and stability of data in a data center.

In a specific implementation process in this embodiment of the present disclosure, there may be different distances between the first data center and the second data center in terms of a geographical location. For example, the first data center and the second data center may be located in a same city, or in different cities, so as to ensure that the two data centers are not faulty simultaneously, thereby implementing disaster recovery.

In a specific implementation process in this embodiment of the present disclosure, the computing node is a carrier having a data processing function, for example, the computing node may be a server. The storage node is a carrier having data storage space, for example, the storage node may be a disk in a server or a computer, or logical storage space such as a logical unit (LU). The N data slices and the M check slices that are corresponding to the to-be-stored data may be obtained by performing an erasure code (EC) algorithm on the to-be-stored data by the computing node.

In this embodiment of the present disclosure, the computing node receives the data storage request, where the data storage request includes the to-be-stored data. The computing node determines the hash partition that stores the to-be-stored data, where the hash partition includes the first storage node group and the second storage node group, the first storage node group includes the R storage nodes that belong to the first data center, the second storage node group includes the R storage nodes that belong to the second data center, and R is an integer greater than 2. The computing node divides the to-be-stored data into the N data slices, and obtains the M check slices of the N data slices, where N and M are positive integers, and N+M=R. The computing node separately writes the N data slices and the M check slices into the R storage nodes in the first storage node group and the R storage nodes in the second storage node group.

In the technical solution in this embodiment of the present disclosure, the to-be-stored data is sliced. The N data slices and the M check slices that are corresponding to the to-be-stored data are separately stored in the R storage nodes that belong to the first data center and the R storage nodes that belong to the second data center. Therefore, when a slice fails to be written into any data center, and a quantity of slices that fail to be written is less than or equal to the quantity M of check slices, a slice that fails to be written may be repaired based on a slice that is successfully written. In other words, in the technical solution in this embodiment of the present disclosure, when a slice fails to be written into any data center, the data center has a repairing capability. Therefore, in the technical solution in this embodiment of the present disclosure, reliability and stability of data in a data center are improved.

With reference to the first aspect, in a first possible implementation of the first aspect, the data storage request further includes a keyword key, and the determining, by the computing node, a hash partition that stores the to-be-stored data specifically includes: determining, by the computing node based on the keyword, the hash partition that stores the to-be-stored data.

In a specific implementation process of the implementation, each hash partition in the distributed storage system may be corresponding to a keyword, and then the computing node may determine, based on the keyword, the hash partition that stores the to-be-stored data.

With reference to the first aspect or the first possible implementation of the first aspect, in a second possible implementation of the first aspect, the distributed storage system further includes a management node, and the hash partition is determined from the first data center and the second data center by the management node based on a fault tolerance level of the distributed storage system.

In the implementation, a dedicated management node is disposed in the distributed storage system, and a plurality of hash partitions are determined from the first data center and the second data center by the management node based on the fault tolerance level of the distributed storage system. The fault tolerance level herein is corresponding to N+M. In a specific implementation process of the present disclosure, the management node groups the storage nodes in the first data center and the second data center based on the fault tolerance level of the distributed storage system, and a one-to-one correspondence is established between the storage node groups in the first data center and the storage node groups in the second data center, so as to determine the plurality of hash partitions.

With reference to any one of the first aspect, or the first and the second possible implementations of the first aspect, in a third possible implementation of the first aspect, the separately writing, by the computing node, the N data slices and the M check slices into the R storage nodes in the first storage node group and the R storage nodes in the second storage node group specifically includes: writing the N data slices and the M check slices into the R storage nodes in the first storage node group; and copying, into the R storage nodes in the second storage node group, the N data slices and the M check slices that are stored in the R storage nodes in the first storage node group.

In the implementation, when performing data writing, the computing node first writes the N data slices and the M check slices into the R storage nodes in the first storage node group, and then copies, into the R storage nodes in the second storage node group, the N data slices and the M check slices that are stored in the R storage nodes in the first storage node group. Therefore, in the implementation, when a slice fails to be written into the first storage node group, repairing may be first performed, and then the repaired slice is copied into the second storage node group, so as to increase a success probability of data writing and improve an active-active feature of an active-active data center.

With reference to the third possible implementation of the first aspect, in a fourth possible implementation of the first aspect, the separately writing, by the computing node, the N data slices and the M check slices into the R storage nodes in the first storage node group and the R storage nodes in the second storage node group further specifically includes: when a slice fails to be written into the first storage node group, and a quantity of slices that fail to be written is less than or equal to M, repairing a slice that fails to be written into a storage node in the first storage node group; and copying, into the R storage nodes in the second storage node group, the repaired N data slices and M check slices that are stored in the R storage nodes in the first storage node group.

In the implementation, when a slice fails to be written into the first storage node group, the slice that fails to be written is first repaired, and then the slice is copied, so as to improve reliability and stability of data in a data center.

With reference to the third possible implementation of the first aspect, in a fifth possible implementation of the first aspect, the separately writing, by the computing node, the N data slices and the M check slices into the R storage nodes in the first storage node group and the R storage nodes in the second storage node group further specifically includes: when a slice fails to be copied into the second storage node group, and a quantity of slices that fail to be copied is less than or equal to M, repairing a slice that fails to be copied into the second storage node group.

In the implementation, when a slice fails to be copied into the second storage node group, the slice that fails to be copied may be repaired, so as to improve reliability and stability of data in a data center.

Corresponding to the data storage method in the first aspect, according to a second aspect, an embodiment of the present disclosure further provides a data reading method, applied to a distributed storage system, and the distributed storage system includes a computing node and a plurality of storage nodes. The method includes: receiving, by the computing node, a data reading request; obtaining, by the computing node, a keyword key corresponding to the data reading request; determining, by the computing node based on the keyword, a hash partition corresponding to the data reading request, where the hash partition includes a third storage node group and a fourth storage node group, the third storage node group includes R storage nodes that belong to a first data center, the fourth storage node group includes R storage nodes that belong to a second data center, the third storage node group and the fourth storage node group separately store R slices that are corresponding to the data reading request and that belong to same data, the R slices are stored in R storage nodes in each storage node group in a one-to-one correspondence manner, the R slices include N data slices and M check slices, N and M are positive integers, and N+M=R; and reading, by the computing node from the third storage node group, the R slices that are corresponding to the data reading request.

In a specific implementation process in this embodiment of the present disclosure, when the data reading request is corresponding to the to-be-stored data in the data storage method, the third storage node group is the same as the first storage node group or the second storage node group in the foregoing data storage method, and the fourth storage node group is the same as the second storage node group or the first storage node group in the foregoing data storage method. For example, the third storage node group is corresponding to the first storage node group in the foregoing data storage method, and the fourth storage node group is corresponding to the second storage node group in the foregoing data storage method. When the data reading request is not corresponding to the to-be-stored data in the data storage method, each of the third storage node group and the fourth storage node group is different from the first storage node group or the second storage node group in the foregoing data storage method.

In this embodiment of the present disclosure, the computing node receives the data reading request. The computing node obtains the keyword key corresponding to the data reading request. The computing node determines, based on the keyword, the hash partition corresponding to the data reading request, where the hash partition includes the third storage node group and the fourth storage node group, the third storage node group includes the R storage nodes that belong to the first data center, the fourth storage node group includes the R storage nodes that belong to the second data center, the third storage node group and the fourth storage node group separately store the R slices that are corresponding to the data reading request and that belong to the same data, the R slices are stored in the R storage nodes in each storage node group in a one-to-one correspondence manner, the R slices include the N data slices and the M check slices, N and M are positive integers, and N+M=R. The computing node reads, from the third storage node group, the R slices that are corresponding to the data reading request.

In the technical solution in this embodiment of the present disclosure, the R slices corresponding to the data reading request include the N data slices and the M check slices that are of the same data. Therefore, when a quantity of damaged slices in the R slices in the third storage node group is less than or equal to the quantity M of check slices, a damaged slice in the R slices may be repaired based on an undamaged slice in the R slices. In other words, in the technical solution in this embodiment of the present disclosure, during data reading, if there is a damaged slice in the R slices corresponding to the data reading request, the damaged slice may be repaired when the quantity of damaged slices is less than or equal to the quantity M of check slices. Therefore, in the technical solution in this embodiment of the present disclosure, reliability and stability of data in a data center are improved.

With reference to the second aspect, in a first possible implementation of the second aspect, the method further includes: when a quantity of damaged slices in the R slices stored in the third storage node group is less than or equal to M, repairing, by the computing node, a corresponding damaged slice by using an undamaged slice in the R slices stored in the third storage node group.

With reference to the first possible implementation of the second aspect, in a second possible implementation of the second aspect, the method further includes: when the quantity of damaged slices in the R slices stored in the third storage node group is greater than M, and there is no damaged slice in the R slices stored in the fourth storage node group, copying, by the computing node into the R storage nodes in the third storage node group in a one-to-one correspondence manner, the R slices stored in the fourth storage node group; when the quantity of damaged slices in the R slices stored in the third storage node group is greater than M, and a quantity of damaged slices in the R slices stored in the fourth storage node group is less than or equal to M, repairing a corresponding damaged slice by using an undamaged slice in the R slices stored in the fourth storage node group; and copying, into the R storage nodes in the third storage node group in a one-to-one correspondence manner, the repaired R slices stored in the fourth storage node group.

In the implementation, when the R slices in the third storage node group cannot be repaired by using the R slices in the third storage node group, the R slices in the third storage node group may be repaired by using the R slices in the fourth storage node group, so that reliability and stability of data in a data center are improved.

With reference to the second possible implementation of the second aspect, in a third possible implementation of the second aspect, the method further includes: when the quantity of damaged slices in the R slices stored in the third storage node group is greater than M, and the quantity of damaged slices in the R slices stored in the fourth storage node group is greater than M, determining, by the computing node, whether a quantity of slices simultaneously damaged in the third storage node group and the fourth storage node group in the R slices is less than or equal to M; and when the quantity of slices simultaneously damaged in the third storage node group and the fourth storage node group in the R slices is less than or equal to M, repairing, by the computing node, corresponding damaged slices in the third storage node group and the fourth storage node group by using undamaged slices in the R slices in the third storage node group and the fourth storage node group.

In the implementation, when the R slices in the third storage node group cannot be repaired by using the R slices in the third storage node group, and the R slices in the fourth storage node group cannot be repaired by using the R slices in the fourth storage node group, the R slices in the third storage node group and the R slices in the fourth storage node group may be repaired based on the undamaged slices in the third storage node group and the fourth storage node group, so that reliability and stability of data in a data center are improved.

According to a third aspect, an embodiment of the present disclosure provides a computing node in a distributed storage system, where the distributed storage system includes the computing node and a plurality of storage nodes, and the computing node includes: a receiving unit, configured to receive a data storage request, where the data storage request includes to-be-stored data; a determining unit, configured to determine a hash partition that stores the to-be-stored data, where the hash partition includes a first storage node group and a second storage node group, the first storage node group includes R storage nodes that belong to a first data center, the second storage node group includes R storage nodes that belong to a second data center, and R is an integer greater than 2; a data division unit, configured to: divide the to-be-stored data into N data slices, and obtain M check slices of the N data slices, where N and M are positive integers, and N+M=R; and a writing unit, configured to separately write the N data slices and the M check slices into the R storage nodes in the first storage node group and the R storage nodes in the second storage node group.

With reference to the third aspect, in a first possible implementation of the third aspect, the data storage request received by the receiving unit further includes a keyword key, and the determining unit is specifically configured to determine, based on the keyword, the hash partition that stores the to-be-stored data.

With reference to the third aspect or the first possible implementation of the third aspect, in a second possible implementation of the third aspect, the computing node further includes: a management unit, configured to determine the hash partition from the first data center and the second data center based on a fault tolerance level of the distributed storage system.

With reference to any one of the third aspect, or the first and the second possible implementations of the third aspect, in a third possible implementation of the third aspect, the writing unit includes: a writing subunit, configured to write the N data slices and the M check slices into the R storage nodes in the first storage node group; and a copying subunit, configured to copy, into the R storage nodes in the second storage node group, the N data slices and the M check slices that are stored in the R storage nodes in the first storage node group.

With reference to the third possible implementation of the third aspect, in a fourth possible implementation of the third aspect, the writing unit further includes: a first repairing subunit, configured to: when a slice fails to be written into the first storage node group, repair a slice that fails to be written into a storage node in the first storage node group; and the copying subunit is further configured to copy, into the R storage nodes in the second storage node group, the repaired N data slices and M check slices that are stored in the R storage nodes in the first storage node group.

With reference to the third possible implementation of the third aspect, in a fifth possible implementation of the third aspect, the writing unit further includes: a second repairing subunit, configured to: when a slice fails to be written into the second storage node group, repair a slice that fails to be written into the second storage node group.

According to a fourth aspect, an embodiment of the present disclosure provides a computing node in a distributed storage system, where the distributed storage system includes the computing node and a plurality of storage nodes, and the computing node includes a processor and a communications interface. The communications interface is configured to receive a data storage request, where the data storage request includes to-be-stored data. The processor is configured to: determine a hash partition that stores the to-be-stored data; divide the to-be-stored data into N data slices, and obtain M check slices of the N data slices; and separately write the N data slices and the M check slices into R storage nodes in a first storage node group and R storage nodes in a second storage node group, where the hash partition includes the first storage node group and the second storage node group, the first storage node group includes R storage nodes that belong to a first data center, and the second storage node group includes R storage nodes that belong to a second data center, R is an integer greater than 2, N and M are positive integers, and N+M=R.

With reference to the fourth aspect, in a first possible implementation of the fourth aspect, the data storage request received by the communications interface further includes a keyword key, and the processor is specifically configured to determine, based on the keyword, the hash partition that stores the to-be-stored data.

With reference to the fourth aspect or the first possible implementation of the fourth aspect, in a second possible implementation of the fourth aspect, the processor is configured to determine the hash partition from the first data center and the second data center based on a fault tolerance level of the distributed storage system.

With reference to any one of the fourth aspect, or the first and the second possible implementations of the fourth aspect, in a third possible implementation of the fourth aspect, the processor is specifically configured to: write the N data slices and the M check slices into the R storage nodes in the first storage node group; and copy, into the R storage nodes in the second storage node group, the N data slices and the M check slices that are stored in the R storage nodes in the first storage node group.

With reference to the third possible implementation of the fourth aspect, in a fourth possible implementation of the fourth aspect, the processor is further configured to: when a slice fails to be written into the first storage node group, repair a slice that fails to be written into a storage node in the first storage node group; and copy, into the R storage nodes in the second storage node group, the repaired N data slices and M check slices that are stored in the R storage nodes in the first storage node group.

With reference to the third possible implementation of the fourth aspect, in a fifth possible implementation of the fourth aspect, the processor is further configured to: when a slice fails to be written into the second storage node group, repair a slice that fails to be written into the second storage node group.

In a specific implementation, the processor of the computing node may be a combination of a central processing unit and a memory, and the central processing unit executes a computer instruction in the memory to implement various implementations of the fourth aspect. A person skilled in the art may learn that the processor may be a dedicated chip, and an implementation (operation) of a controller in this embodiment of the present disclosure may alternatively be implemented in another implementation. For example, all implementations (operations) of the processor in this embodiment of the present disclosure are executed by using a field programmable gate array (FPGA) or other hardware, or some implementations (operations) of the processor in this embodiment of the present disclosure are separately executed by using an FPGA or other hardware and the processor, to implement the implementations (operations) of the processor described in this embodiment of the present disclosure.

According to a fifth aspect, an embodiment of the present disclosure provides a computer storage medium. The computer storage medium may store a program, and some or all steps in any implementation of the data storage method and the data reading method provided in the present disclosure may be performed when the program is executed.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

Figure 1:
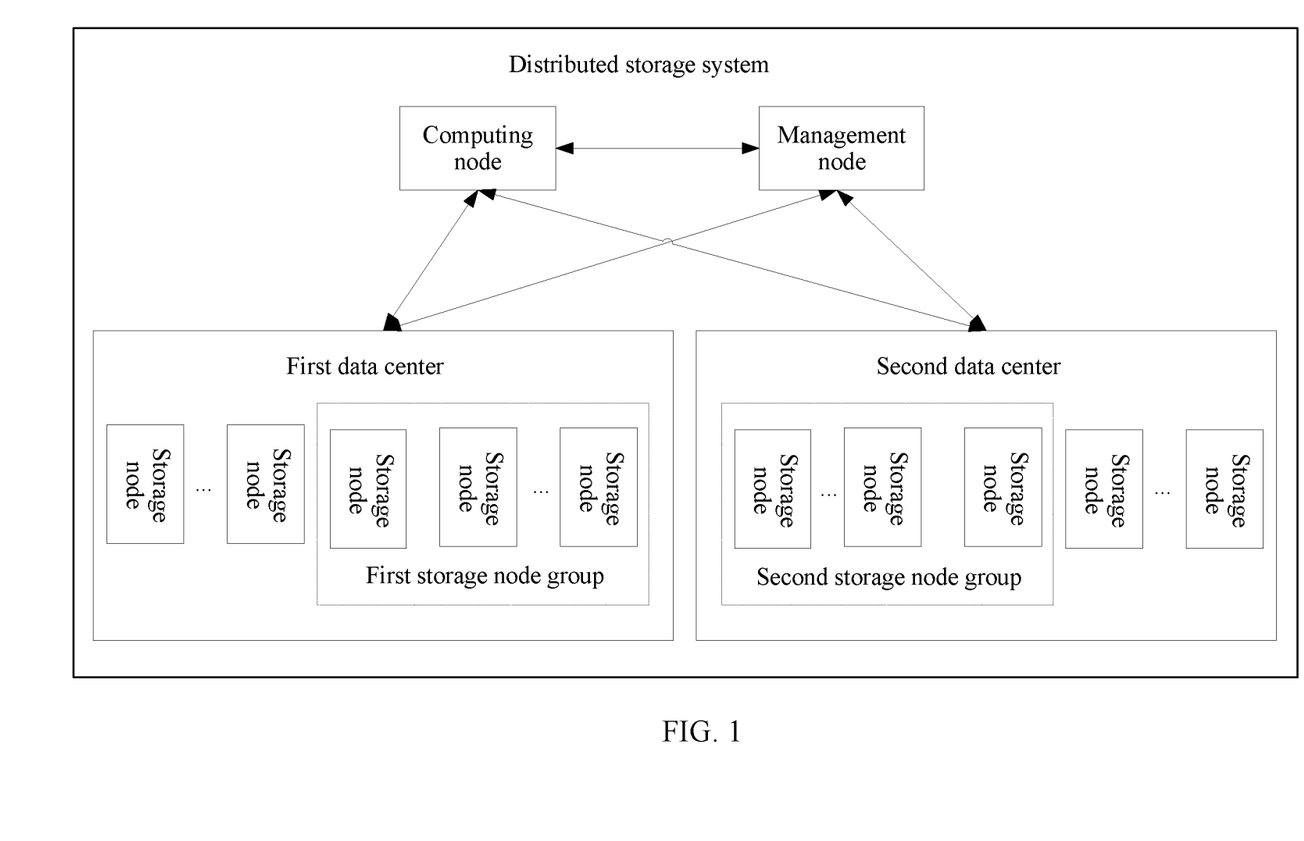
FIG. 1 is a schematic structural diagram of a distributed storage system according to an embodiment of the present disclosure.

For ease of understanding, an application scenario in the embodiments of the present disclosure is first described. The application scenario in the embodiments of the present disclosure is a distributed storage system. As shown in FIG. 1, FIG. 1 is a schematic structural diagram of a distributed storage system according to an embodiment of the present disclosure. The distributed storage system shown in FIG. 1 includes one computing node, one management node, and two data centers (a first data center and a second data center), and each data center includes a plurality of storage nodes. In a specific implementation process in this embodiment of the present disclosure, the computing node is a carrier having a data processing function. For example, the computing node may be a server. The storage node is a carrier having data storage space. For example, the storage node may be a disk in a server or a computer, or logical storage space such as a logical unit (LU).

The management node may determine, based on a fault tolerance level of the distributed storage system, a plurality of hash partitions from the first data center and the second data center of the distributed storage system according to a consistent hashing partition algorithm. Specifically, for example, an erasure code (EC) level of the distributed storage system is N+M (herein, N represents a quantity of data slices, and M represents a quantity of check slices), and N and M are positive integers. The management node may determine a plurality of storage node groups by using a storage node in the first data center, and determine storage node groups of a same quantity as that in the first data center by using a storage node in the second data center. A quantity R of storage nodes in each storage node group is corresponding to the EC level, and specifically, R=N+M. Further, a one-to-one correspondence is established between the storage node groups in the first data center and the storage node groups in the second data center, to obtain the plurality of hash partitions (In FIG. 1, only a first storage node group and a second storage node group that belong to a same hash partition are distinguished, and other hash partitions are not distinguished). It should be noted that N and M are positive integers, and therefore R is an integer greater than 2. For example, when N=2 and M=1, R=3; or when N=12 and M=3, R=15.

In this embodiment of the present disclosure, to-be-stored data is stored in two storage node groups in a same partition based on the fault tolerance level, and the storage node groups are located in different data centers, thereby improving reliability and stability of data in a data center.

When the plurality of hash partitions are obtained by the management node through division, the computing node may perform EC processing on received to-be-stored data, to obtain N data slices and M check slices, and store the obtained N data slices and the obtained M check slices in R storage nodes in each storage node group in a determined hash partition. The following describes in detail, with reference to a specific embodiment, a storage process after the computing node receives the to-be-stored data.

Figure 2:
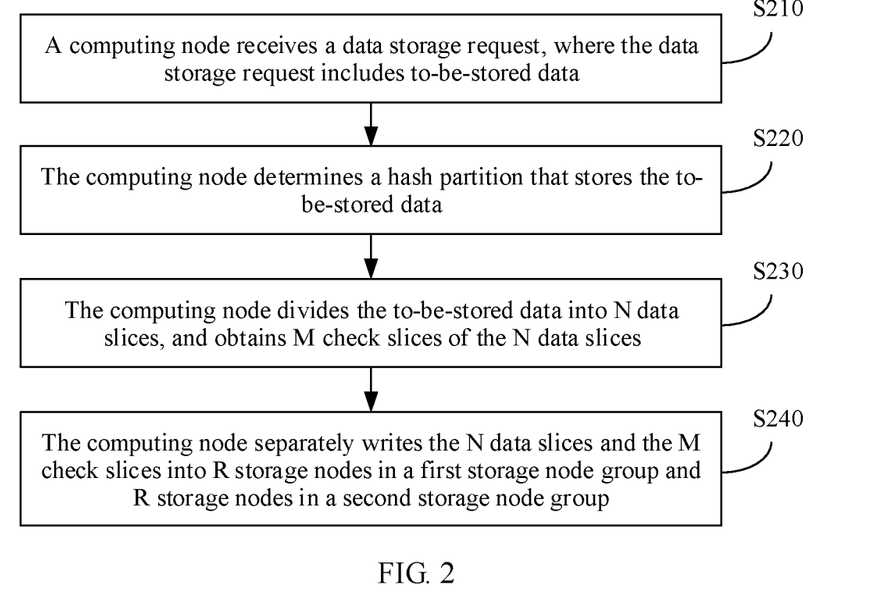
FIG. 2 is a flowchart of a data storage method according to an embodiment of the present disclosure.

FIG. 2 is a flowchart of a data storage method according to an embodiment of the present disclosure. This embodiment of the present disclosure may be applied to the distributed storage system shown in FIG. 1. Specifically, this embodiment may include the following steps.

Step S210: A computing node receives a data storage request, where the data storage request includes to-be-stored data.

Specifically, the to-be-stored data may be video data, text data, a compressed package, or the like.

Step S220: The computing node determines a hash partition that stores the to-be-stored data.

In a specific implementation process in this embodiment of the present disclosure, a keyword key may be included in the data storage request, and a one-to-one correspondence between keywords and a plurality of hash partitions obtained by a management node through division is stored in the distributed storage system, for example, stored in a storage node of the distributed storage system. On this basis, the computing node may determine, based on the keyword key included in the data storage request, the hash partition that stores the to-be-stored data from the plurality of hash partitions obtained by the management node through division. In addition, different keywords may be respectively stored in a plurality of hash partitions. In this case, the computing node may determine, based on the keyword key included in the data storage request, the hash partition that stores the to-be-stored data from the plurality of hash partitions obtained by the management node through division.

For ease of description, in the following, a storage node group including R storage nodes in a first data center in the hash partition that stores the to-be-stored data is referred to as a first storage node group, and a storage node group including R storage nodes in a second data center in the hash partition that stores the to-be-stored data is referred to as a second storage node group.

Step S230: The computing node divides the to-be-stored data into N data slices, and obtains M check slices of the N data slices.

Specifically, in this step, the computing node performs EC processing on the to-be-stored data, and can obtain the N data slices and the M check slices that are corresponding to an EC level. For example, if corresponding to the EC level, N is 12, and M is 3, 12 data slices and three check slices are obtained after EC processing is performed on the to-be-stored data. In a specific implementation process in this embodiment of the present disclosure, specific values of N and M that are corresponding to the EC level may be determined based on requirements for reliability and persistence of the to-be-stored data.

In addition, it should be noted that, in this embodiment shown in FIG. 2, step S230 is performed after step S220. However, in a specific implementation process of the present disclosure, step S230 may alternatively be performed before step S220, or step S230 and step S220 may be synchronously performed.

Step S240: The computing node separately writes the N data slices and the M check slices into R storage nodes in a first storage node group and R storage nodes in a second storage node group.

Specifically, after the computing node performs EC processing on the to-be-stored data, and obtains the N data slices and the M check slices that are corresponding to the EC level, further, the computing node writes the N data slices and the M check slices that are obtained after EC processing into the R storage nodes in the first storage node group in a one-to-one correspondence manner, and into the R storage nodes in the second storage node group in a one-to-one correspondence manner. The one-to-one correspondence herein means that one data slice or one check slice is written into one storage node, and slices (data slices or check slices) stored in storage nodes in a same storage node group are different from each other.

For example, in a specific implementation in this embodiment of the present disclosure, corresponding to the EC level, N is 12, and M is 3. The first storage node group includes a first storage node, a second storage node, . . . , and a $15^{th}$ storage node, and the second storage node group includes a $16^{th}$ storage node, a $17^{th}$ storage node, . . . , and a $30^{th}$ storage node. After EC processing is performed on the to-be-stored data, a first data slice, a second data slice, . . . , and a $12^{th}$ data slice, and a first check slice, a second check slice, and a third check slice are obtained. When slices are written into the 15 storage nodes in the first storage node group, the first data slice, the second data slice, . . . , and the $12^{th}$ data slice may be written into the first storage node, the second storage node, . . . , and the $12^{th}$ storage node, and the first check slice, the second check slice, and the third check slice may be written into the $13^{th}$ storage node, the $14^{th}$ storage node, and the $15^{th}$ storage node. When slices are written into the 15 storage nodes in the second storage node group, the first data slice, the second data slice, . . . , and the $12^{th}$ data slice may be written into the $16^{th}$ storage node, the $17^{th}$ storage node, . . . , and the $27^{th}$ storage node, and the first check slice, the second check slice, and the third check slice are written into the $28^{th}$ storage node, the $29^{th}$ storage node, and the $30^{th}$ storage node.

In addition, it should be noted that, in a specific implementation process in this embodiment of the present disclosure, the computing node may simultaneously write the N data slices and the M check slices that are obtained after EC processing is performed on the to-be-stored data into the R storage nodes in the first storage node group and the R storage nodes in the second storage node group in a one-to-one correspondence manner. The computing node may alternatively first write the N data slices and the M check slices that are obtained after EC processing is performed on the to-be-stored data into R storage nodes in one storage node group in a one-to-one correspondence manner, and then copy, into R storage nodes in the other storage node group, the N data slices and the M check slices that are stored in the R storage nodes in the storage node group. In a specific implementation process of the present disclosure, the computing node may first write the N data slices and the M check slices into R storage nodes in a storage node group into which temporarily no data is written and from which temporarily no data is read, and then copy the N data slices and the M check slices into R storage nodes in the other storage node group; Alternatively, the computing node may select one storage node group from the first storage node group and the second storage node group at random, write the N data slices and the M check slices into the storage node group, and then copy the N data slices and the M check slices into R storage nodes in the other storage node group.

For example, the computing node may first write the N data slices and the M check slices that are obtained after EC processing is performed on the to-be-stored data into the R storage nodes in the first storage node group in a one-to-one correspondence manner, and then copy, into the R storage nodes in the second storage node group, the N data slices and the M check slices that are stored in the R storage nodes in the first storage node group. In this case, in a specific implementation process in this embodiment of the present disclosure, when the computing node finds that a slice fails to be written into the first storage node group, and a quantity of slices that fail to be written is less than or equal to M, the computing node may repair a slice that fails to be written into a storage node in the first storage node group, and after repairing, the computing node copies, into the R storage nodes in the second storage node group, the repaired N data slices and M check slices that are stored in the R storage nodes in the first storage node group. Correspondingly, in a specific implementation process in this embodiment of the present disclosure, when the computing node finds that a slice fails to be copied into the second storage node group, and a quantity of slices that fail to be copied is less than or equal to M, the computing node may repair a slice that fails to be copied into a storage node in the second storage node group. When a slice fails to be written or copied, the computing node may record a log, and obtain the quantity of slices that fail to be written or the quantity of slices that fail to be copied based on the recorded log.

In this embodiment of the present disclosure, the computing node receives the data storage request, where the data storage request includes the to-be-stored data. The computing node determines the hash partition that stores the to-be-stored data, where the hash partition includes the first storage node group and the second storage node group, the first storage node group includes the R storage nodes that belong to the first data center, the second storage node group includes the R storage nodes that belong to the second data center, and R is an integer greater than 2. The computing node divides the to-be-stored data into the N data slices, and obtains the M check slices of the N data slices, where N and M are positive integers, and N+M=R. The computing node separately writes the N data slices and the M check slices into the R storage nodes in the first storage node group and the R storage nodes in the second storage node group.

In the technical solution in this embodiment of the present disclosure, the to-be-stored data is sliced. The N data slices and the M check slices that are corresponding to the to-be-stored data are separately stored in the R storage nodes that belong to the first data center and the R storage nodes that belong to the second data center. Therefore, when a slice fails to be written into any data center, and a quantity of slices that fail to be written is less than or equal to the quantity M of check slices, a slice that fails to be written may be repaired based on a slice that is successfully written. In other words, in the technical solution in this embodiment of the present disclosure, when a slice fails to be written into any data center, the data center has a repairing capability. Therefore, in the technical solution in this embodiment of the present disclosure, reliability and stability of data in a data center are improved.

Figure 3:
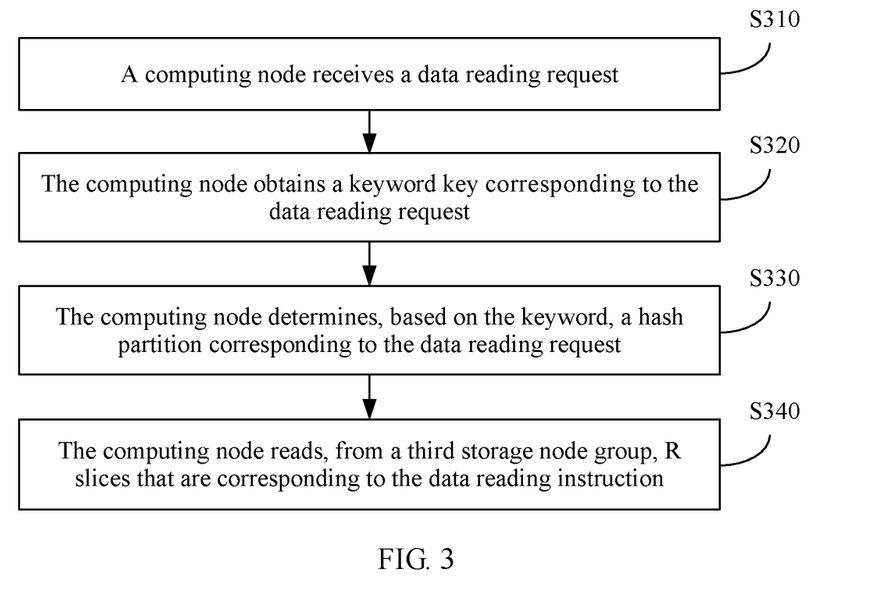
FIG. 3 is a flowchart of a data reading method according to an embodiment of the present disclosure.

As shown in FIG. 3, compared with the data storage method in the foregoing embodiment, an embodiment of the present disclosure further provides a data reading method, and this embodiment of the present disclosure may be applied to the distributed storage system shown in FIG. 1. Specifically, this embodiment may include the following steps.

Step S310: A computing node receives a data reading request.

Specifically, the data reading request may be sent to the computing node when a user executes a specific operation, or may be sent to the computing node by using pre-written code when the distributed storage system executes a process.

Step S320: The computing node obtains a keyword key corresponding to the data reading request.

Specifically, in a specific implementation of the present disclosure, the keyword key corresponding to the data reading request may be include in the data reading request. In this case, the computing node directly obtains the keyword key corresponding to the data reading request. Alternatively, information that has a correspondence with the keyword key corresponding to the data reading request may be included in the data reading request, and the computing node may first obtain the correspondence, and then obtains, based on the correspondence, the keyword key corresponding to the data reading request.

Step S330: The computing node determines, based on the keyword, a hash partition corresponding to the data reading request.

Specifically, a one-to-one correspondence between keywords and a plurality of hash partitions obtained by a management node through division may be stored in the distributed storage system, for example, stored in a storage node of the distributed storage system. On this basis, the computing node may determine, based on the keyword key that is obtained in step S320, the hash partition corresponding to the data reading request from the plurality of hash partitions obtained by the management node through division. In addition, different keywords may be respectively stored in a plurality of hash partitions. In this case, the computing node may also determine, based on the keyword key that is obtained in step S320, the hash partition corresponding to the data reading request from the plurality of hash partitions obtained by the management node through division.

For ease of description, in the following, a storage node group that includes R storage nodes in a first data center and that is in the hash partition corresponding to the data reading request is referred to as a third storage node group, and a storage node group that includes R storage nodes in a second data center and that is in the hash partition corresponding to the data reading request is referred to as a fourth storage node group. The third storage node group and the fourth storage node group separately store R slices that are corresponding to the data reading request and that belong to same data. The R slices are stored in R storage nodes in each storage node group in a one-to-one correspondence manner. The R slices include N data slices and M check slices that are obtained after EC processing is pre-performed on the same data, N and M are positive integers, and N+M=R.

In addition, in a specific implementation process in this embodiment of the present disclosure, when the data reading request is corresponding to the to-be-stored data in the data storage method, the third storage node group is the same as the first storage node group or the second storage node group in the foregoing data storage method, and the fourth storage node group is the same as the second storage node group or the first storage node group in the foregoing data storage method. For example, the third storage node group is corresponding to the first storage node group in the foregoing data storage method, and the fourth storage node group is corresponding to the second storage node group in the foregoing data storage method. When the data reading request is not corresponding to the to-be-stored data in the data storage method, each of the third storage node group and the fourth storage node group is different from the first storage node group or the second storage node group in the foregoing data storage method.

Step S340: The computing node reads, from a third storage node group, R slices that are corresponding to the data reading request.

In a specific implementation process of the present disclosure, the computing node may first determine, as the third storage node group, a storage node group that is in the hash partition corresponding to the data reading request, into which temporarily no data is written, and from which temporarily no data is read; or any one storage node group in the hash partition corresponding to the data reading request may be referred to as the third storage node group.

In this embodiment of the present disclosure, the computing node receives the data reading request. The computing node obtains the keyword key corresponding to the data reading request. The computing node determines, based on the keyword, the hash partition corresponding to the data reading request, where the hash partition includes the third storage node group and the fourth storage node group, the third storage node group includes the R storage nodes that belong to the first data center, the fourth storage node group includes the R storage nodes that belong to the second data center, the third storage node group and the fourth storage node group separately store the R slices that are corresponding to the data reading request and that belong to the same data, the R slices are stored in the R storage nodes in each storage node group in a one-to-one correspondence manner, the R slices include the N data slices and the M check slices, N and M are positive integers, and N+M=R. The computing node reads, from the third storage node group, the R slices that are corresponding to the data reading request.

In the technical solution in this embodiment of the present disclosure, the R slices corresponding to the data reading request include the N data slices and the M check slices that are of the same data. Therefore, when a quantity of damaged slices in the R slices in the first storage node group is less than or equal to the quantity M of check slices, a damaged slice in the R slices may be repaired based on an undamaged slice in the R slices. In other words, in the technical solution in this embodiment of the present disclosure, during data reading, if there is a damaged slice in the R slices corresponding to the data reading request, the damaged slice may be repaired when the quantity of damaged slices is less than or equal to the quantity M of check slices. Therefore, in the technical solution in this embodiment of the present disclosure, reliability and stability of data in a data center are improved.

In a specific implementation process of the present disclosure, a slice that belongs to the R slices and that is stored in each storage node in the third storage node group may be inevitably damaged. Therefore, in a specific implementation of the present disclosure, the data reading method shown in FIG. 3 may further include the following: The computing node determines whether the quantity of damaged slices in the R slices stored in the third storage node group is less than or equal to M, and when the quantity of damaged slices in the R slices stored in the third storage node group is less than or equal to M, the computing node repairs a corresponding damaged slice by using an undamaged slice in the R slices stored in the third storage node group.

Further, when the quantity of damaged slices in the R slices stored in the third storage node group is greater than M, the data reading method shown in FIG. 3 may further include the following: The computing node determines whether there is a damaged slice in the R slices stored in the fourth storage node group, and when there is a damaged slice, determines whether a quantity of damaged slices in the R slices stored in the fourth storage node group is less than or equal to M. When there is no damaged slice in the R slices stored in the fourth storage node group, the computing node copies, into the R storage nodes in the third storage node group in a one-to-one correspondence manner, the R slices stored in the fourth storage node group, so that the computing node reads the copied R slices from the third storage node group. When the quantity of damaged slices in the R slices stored in the fourth storage node group is less than or equal to M, a corresponding damaged slice is repaired by using an undamaged slice in the R slices stored in the fourth storage node group, and the repaired R slices stored in the fourth storage node group are copied into the R storage nodes in the third storage node group in a one-to-one correspondence manner, so that the computing node reads the copied R slices from the third storage node group.

In the implementation, when the R slices in the third storage node group cannot be repaired by using the R slices in the third storage node group, the R slices in the third storage node group may be repaired by using the R slices in the fourth storage node group, so that reliability and stability of data in a data center are improved.

Furthermore, when the quantity of damaged slices in the R slices stored in the fourth storage node group is also greater than M, the data reading method shown in FIG. 3 may further include the following: The computing node determines whether a quantity of slices simultaneously damaged in the third storage node group and the fourth storage node group in the R slices is less than or equal to M, and when the quantity of slices simultaneously damaged in the third storage node group and the fourth storage node group in the R slices is less than or equal to M, the computing node repairs corresponding damaged slices in the third storage node group and the fourth storage node group by using undamaged slices in the R slices in the third storage node group and the fourth storage node group.

In the implementation, when the R slices in the third storage node group cannot be repaired by using the R slices in the third storage node group, and the R slices in the fourth storage node group cannot be repaired by using the R slices in the fourth storage node group, the R slices in the third storage node group and the R slices in the fourth storage node group may be repaired based on the undamaged slices in the third storage node group and the fourth storage node group, so that reliability and stability of data in a data center are improved.

Figure 4:
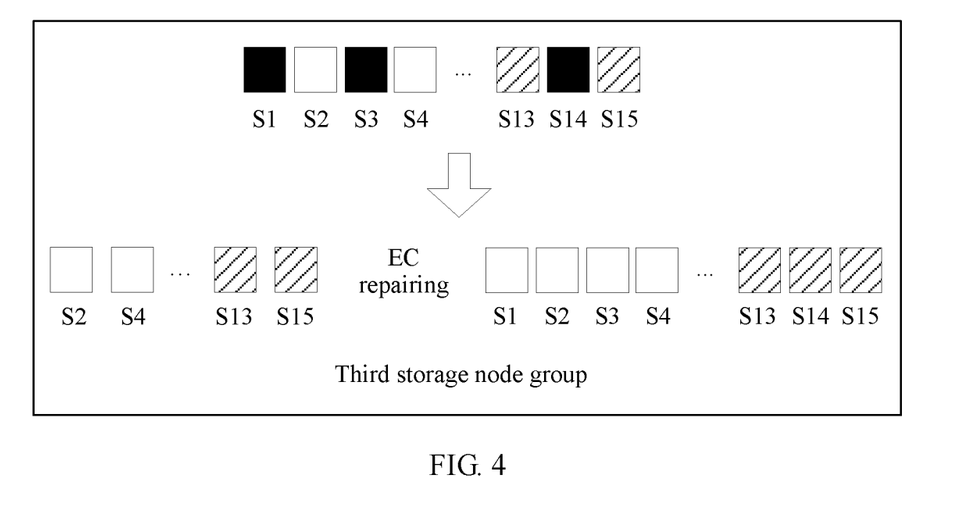
FIG. 4 is a schematic diagram of EC repairing according to an embodiment of the present disclosure.
Figure 5:
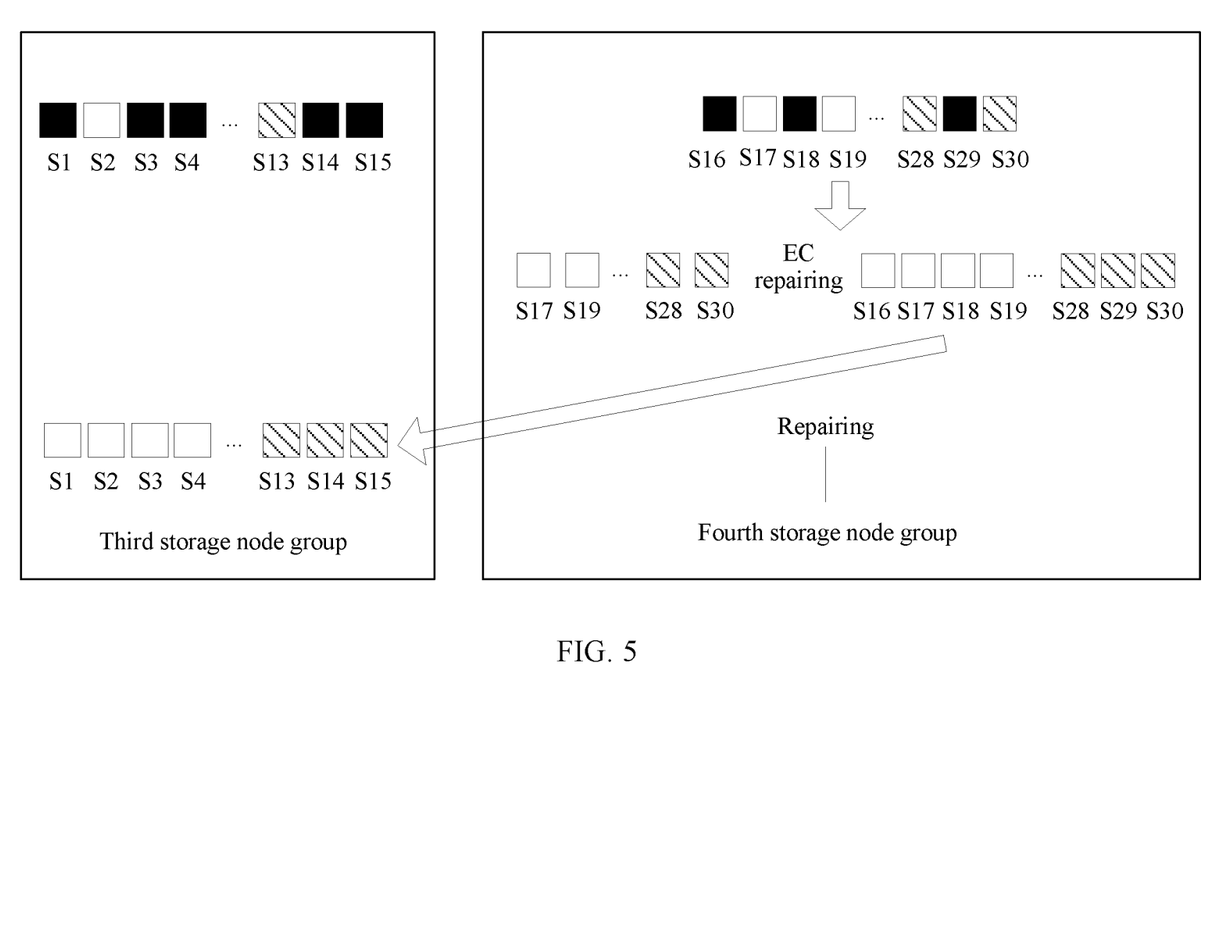
FIG. 5 is another schematic diagram of EC repairing according to an embodiment of the present disclosure.
Figure 6:
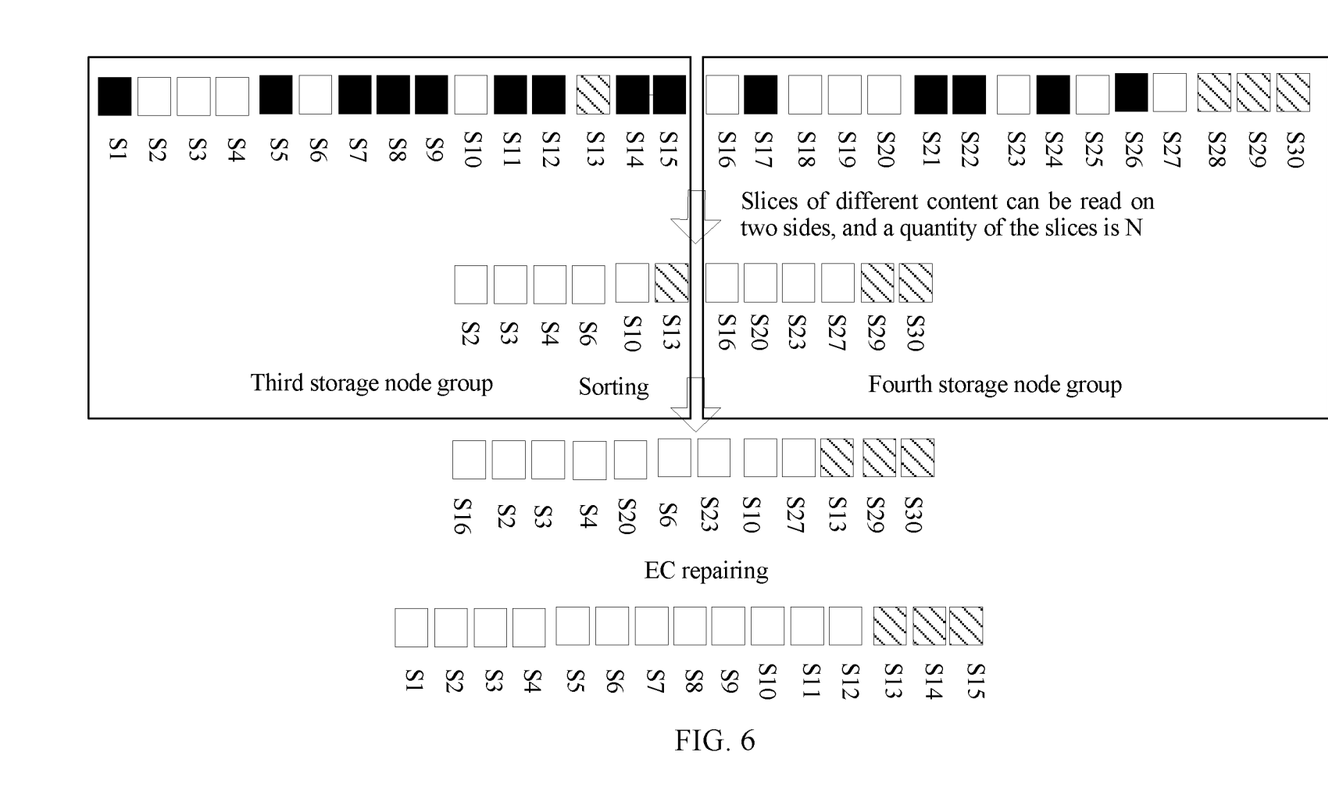
FIG. 6 is still another schematic diagram of EC repairing according to an embodiment of the present disclosure.

To more intuitively present a process of repairing a damaged slice during a data reading process, the following describes three different repairing processes with reference to FIG. 4 to FIG. 6. In FIG. 4 to FIG. 6, N=12, and M=3. 12 data slices in the third storage node group are represented by S1, S2, ..., and S12, and three check slices are represented by S13, S14, and S15. 12 data slices in the fourth storage node group are represented by S16, S17, ..., and S27, and three check slices are represented by S28, S29, and S30. A one-to-one correspondence is established between slices in the third storage node group and the fourth storage node group in a left-to-right sequence, and the slices are stored in corresponding storage nodes.

As shown in FIG. 4, damaged slices in the third storage node group include S1, S3, and S14, and a quantity of damaged slices is 3, and is equal to M. Therefore, the computing node may perform EC repairing on S1, S3 and S14 by using 12 undamaged slices S2, S4, ..., S13, and S15 in the third storage node group, and finally obtain 15 undamaged slices S1, S2, S3, S4, ..., S13, S14, and S15.

As shown in FIG. 5, damaged slices in the third storage node group are S1, S3, S4, S14, and S15, and a quantity of damaged slices is 5, and is greater than M. However, damaged slices in the fourth storage node group are S16, S18, and S29, and a quantity of damaged slices is 3, and is equal to M. Therefore, the computing node may perform EC repairing on S16, S18, and S29 by using 12 undamaged slices S17, S19, ..., S28, and S30 in the fourth storage node group, and obtain 15 undamaged slices S16, S17, S18, S19, ..., S28, S29, and S30. Further, the repaired 15 undamaged slices are copied into the third storage node group, to obtain undamaged S1, S2, S3, S4, ... S13, S14, and S15.

As shown in FIG. 6, damaged slices in the third storage node group are S1, S5, S7, S8, S9, S11, S12, S14, and S15, and a quantity of damaged slices in the third storage node group is 9, and is greater than M. Damaged slices in the fourth storage node group are S17, S21, S22, S24, and S26, and a quantity of damaged slices in the fourth storage node group is 5, and is greater than M. However, simultaneously damaged slices in the third storage node group and the fourth storage node group include S7 (corresponding to S22), S9 (corresponding to S24), and S11 (corresponding to S26), and a quantity of slices simultaneously damaged in the third storage node group and the fourth storage node group is 3, and is equal to M. In this case, the computing node extracts different undamaged slices from the third storage node group and the fourth storage node group. Specifically, the computing node extracts S2, S3, S4, S6, S10, and S13 from the third storage node group, and extracts S16, S20, S23, S27, S29, and S30 from the fourth storage node group. Then the 12 undamaged slices that are extracted from the third storage node group and the fourth storage node group are sorted in a sequence of S16, S2, S3, S4, S20, S6, S23, S10, S27, S13, S29, and S30, and EC repairing is performed by using the 12 undamaged slices, to obtain 15 undamaged slices S1, S2, S3, S4, ..., S13, S14, and S15. It should be additionally noted that, in a specific implementation process of the present disclosure, the obtained 15 undamaged slices may further be copied into the fourth storage node group, to obtain S16, S17, S18, S19, ..., S28, S29, and S30.

It should be additionally noted that the distributed storage system shown in FIG. 1 only includes one computing node and one management node, but in a specific implementation process in this embodiment of the present disclosure, the distributed storage system may include a plurality of computing nodes, and each computing node can perform the data storage method and the data reading method in the foregoing embodiments. The distributed storage system may alternatively include a plurality of management nodes, and the plurality of management nodes jointly complete a hash partitioning process of the distributed storage system. In addition, a function of the management node may be completed by the computing node. In this case, there may be no management node.

Compared with the data storage method in the foregoing embodiments, embodiments of the present disclosure further provide a computing node in a distributed storage system.

Figure 7:
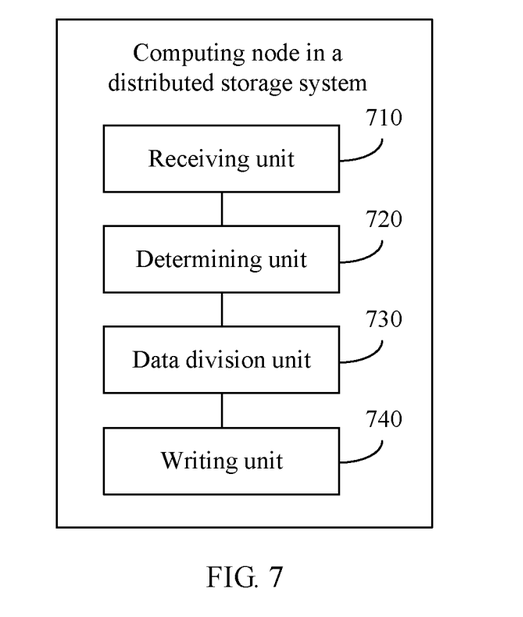
FIG. 7 is a schematic structural diagram of a computing node in a distributed storage system according to an embodiment of the present disclosure.

FIG. 7 is a schematic structural diagram of a computing node in a distributed storage system according to an embodiment of this application. The distributed storage system includes the computing node and a plurality of storage nodes, and the computing node is configured to perform the data storage method shown in FIG. 2. The computing node may include a receiving unit 710, a determining unit 720, a data division unit 730, and a writing unit 740.

The receiving unit 710 is configured to receive a data storage request, where the data storage request includes to-be-stored data.

The determining unit 720 is configured to determine a hash partition that stores the to-be-stored data, where the hash partition includes a first storage node group and a second storage node group, the first storage node group includes R storage nodes that belong to a first data center, the second storage node group includes R storage nodes that belong to a second data center, and R is an integer greater than 2.

The data division unit 730 is configured to: divide the to-be-stored data into N data slices, and obtain M check slices of the N data slices, where N and M are positive integers, and N+M=R.

The writing unit 740 is configured to separately write the N data slices and the M check slices into the R storage nodes in the first storage node group and the R storage nodes in the second storage node group.

In this embodiment of the present disclosure, the receiving unit receives the data storage request, where the data storage request includes the to-be-stored data. The determining unit determines the hash partition that stores the to-be-stored data, where the hash partition includes the first storage node group and the second storage node group, the first storage node group includes the R storage nodes that belong to the first data center, the second storage node group includes the R storage nodes that belong to the second data center, and R is an integer greater than 2. The data division unit divides the to-be-stored data into the N data slices, and obtains the M check slices of the N data slices, where N and M are positive integers, and N+M=R. The writing unit separately writes the N data slices and the M check slices into the R storage nodes in the first storage node group and the R storage nodes in the second storage node group.

In the technical solution in this embodiment of the present disclosure, the to-be-stored data is sliced. The N data slices and the M check slices that are corresponding to the to-be-stored data are separately stored in the R storage nodes that belong to the first data center and the R storage nodes that belong to the second data center. Therefore, when a slice fails to be written into any data center, and a quantity of slices that fail to be written is less than or equal to the quantity M of check slices, a slice that fails to be written may be repaired based on a slice that is successfully written. In other words, in the technical solution in this embodiment of the present disclosure, when a slice fails to be written into any data center, the data center has a repairing capability. Therefore, in the technical solution in this embodiment of the present disclosure, reliability and stability of data in a data center are improved.

Optionally, in a specific implementation in this embodiment of the present disclosure, the data storage request received by the receiving unit 710 further includes a keyword key, and the determining unit 720 is specifically configured to determine, based on the keyword, the hash partition that stores the to-be-stored data.

In another specific implementation in this embodiment of the present disclosure, the computing node may further include a management unit.

The management unit is configured to determine the hash partition from the first data center and the second data center based on a fault tolerance level of the distributed storage system.

In still another specific implementation in this embodiment of the present disclosure, the writing unit 740 may include a writing subunit and a copying subunit.

The writing subunit is configured to write the N data slices and the M check slices into the R storage nodes in the first storage node group.

The copying subunit is configured to copy, into the R storage nodes in the second storage node group, the N data slices and the M check slices that are stored in the R storage nodes in the first storage node group.

In still another specific implementation in this embodiment of the present disclosure, the writing unit 740 may further include a first repairing subunit.

The first repairing subunit is configured to: when a slice fails to be written into the first storage node group, repair a slice that fails to be written into a storage node in the first storage node group.

The copying subunit is further configured to copy, into the R storage nodes in the second storage node group, the repaired N data slices and M check slices that are stored in the R storage nodes in the first storage node group.

In still another specific implementation in this embodiment of the present disclosure, the writing unit 740 may further include a second repairing subunit.

The second repairing subunit is configured to: when a slice fails to be written into the second storage node group, repair a slice that fails to be written into the second storage node group.

Figure 8:
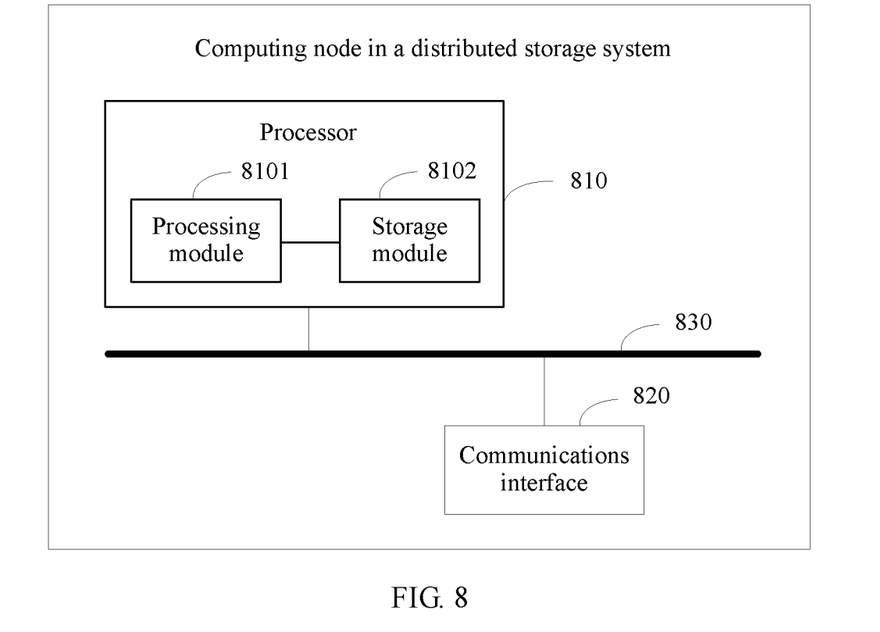
FIG. 8 is a structural block diagram of a computing node in a distributed storage system according to an embodiment of the present disclosure.

An embodiment of the present disclosure further provides a computing node in a distributed storage system. FIG. 8 is a structural block diagram of the computing node in the distributed storage system according to this embodiment of the present disclosure. The distributed storage system includes the computing node and a plurality of storage nodes, and the computing node includes a processor 810, a communications interface 820, and a communications bus 830.

Both the communications interface 820 and the processor 810 are connected to the communications bus 830.

The communications interface 820 is configured to receive a data storage request, where the data storage request includes to-be-stored data.

The processor 810 is configured to: determine a hash partition that stores the to-be-stored data; divide the to-be-stored data into N data slices, and obtain M check slices of the N data slices; and separately write the N data slices and the M check slices into R storage nodes in a first storage node group and R storage nodes in a second storage node group, where the hash partition includes the first storage node group and the second storage node group, the first storage node group includes R storage nodes that belong to a first data center, the second storage node group includes R storage nodes that belong to a second data center, R is an integer greater than 2, N and M are positive integers, and N+M=R.

In a specific implementation process in this embodiment of the present disclosure, the processor 810 includes a processing module 8101 and a storage module 8102. The processing module 8101 completes a storage process of the to-be-stored data by running or executing a software program and/or a module stored in the storage module 8102. Specifically, the processing module 8101 may be a central processing unit (CPU), and the storage module 8102 is a memory. In a specific implementation, a person skilled in the art may learn that the processor may be a dedicated chip, and an implementation (operation) of a controller in this embodiment of the present disclosure may alternatively be implemented in another implementation. For example, all implementations (operations) of the processor in this embodiment of the present disclosure are executed by using a field programmable gate array (FPGA) or other hardware, or some implementations (operations) of the processor in this embodiment of the present disclosure are separately executed by using an FPGA or other hardware and the processor, to implement the implementations (operations) of the processor described in this embodiment of the present disclosure. The communications interface may be specifically a network interface card (NIC), a host bus adapter (HBA), or the like. This is not limited in the embodiments of the present disclosure. The network interface card is also referred to as a network adapter.

In this embodiment of the present disclosure, the communications interface receives the data storage request, where the data storage request includes the to-be-stored data. The processor determines the hash partition that stores the to-be-stored data, divides the to-be-stored data into the N data slices, obtains the M check slices of the N data slices, and separately writes the N data slices and the M check slices into the R storage nodes in the first storage node group and the R storage nodes in the second storage node group, where the hash partition includes the first storage node group and the second storage node group, the first storage node group includes the R storage nodes that belong to the first data center, the second storage node group includes the R storage nodes that belong to the second data center, R is an integer greater than 2, N and M are positive integers, and N+M=R.

In the technical solution in this embodiment of the present disclosure, the to-be-stored data is sliced. The N data slices and the M check slices that are corresponding to the to-be-stored data are separately stored in the R storage nodes that belong to the first data center and the R storage nodes that belong to the second data center. Therefore, when a slice fails to be written into any data center, and a quantity of slices that fail to be written is less than or equal to the quantity M of check slices, a slice that fails to be written may be repaired based on a slice that is successfully written. In other words, in the technical solution in this embodiment of the present disclosure, when a slice fails to be written into any data center, the data center has a repairing capability. Therefore, in the technical solution in this embodiment of the present disclosure, reliability and stability of data in a data center are improved.

In a specific implementation in this embodiment of the present disclosure, the data storage request received by the communications interface 820 further includes a keyword key, and the processor 810 is specifically configured to determine, based on the keyword, the hash partition that stores the to-be-stored data.

In another specific implementation in this embodiment of the present disclosure, the processor 810 is configured to determine the hash partition from the first data center and the second data center based on a fault tolerance level of the distributed storage system.

In still another specific implementation in this embodiment of the present disclosure, the processor 810 is specifically configured to: write the N data slices and the M check slices into the R storage nodes in the first storage node group; and copy, into the R storage nodes in the second storage node group, the N data slices and the M check slices that are stored in the R storage nodes in the first storage node group.

In still another specific implementation in this embodiment of the present disclosure, the processor 810 is further configured to: when a slice fails to be written into the first storage node group, repair a slice that fails to be written into a storage node in the first storage node group; and copy, into the R storage nodes in the second storage node group, the repaired N data slices and M check slices that are stored in the R storage nodes in the first storage node group.

In still another specific implementation in this embodiment of the present disclosure, the processor 810 is further configured to: when a slice fails to be written into the second storage node group, repair a slice that fails to be written into the second storage node group.

An embodiment of the present disclosure further provides a computer storage medium. The computer storage medium may store a program, and some or all steps in any implementation of the data storage method and the data reading method provided in the embodiments shown in FIG. 2 to FIG. 6 may be performed when the program is executed.

A person skilled in the art may clearly understand that, the technologies in the embodiments of the present disclosure may be implemented by software and a necessary general hardware platform. Based on such an understanding, the technical solutions in the embodiments of the present disclosure essentially, or the part contributing to the prior art may be implemented in a form of a software product. The computer software product is stored in a storage medium, such as a ROM/RAM, a hard disk, or a compact disc, and includes several indications for instructing a computer device (which may be a personal computer, a server, a network device, or the like) to perform the methods described in the embodiments or some parts of the embodiments of the present disclosure.

The embodiments in this specification are all described in a progressive manner, for same or similar parts in the embodiments, refer to these embodiments, and each embodiment focuses on a difference from other embodiments. Especially, system and apparatus embodiments are basically similar to a method embodiment, and therefore are described briefly. For related parts, refer to partial descriptions in the method embodiment.

The foregoing descriptions are implementations of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A data storage method in a distributed storage system comprising a computing node and a plurality of storage nodes, the method performed by the computing node, the method comprising:

receiving a data storage request comprises to-be-stored data;

determining a hash partition to store the to-be-stored data, wherein the hash partition comprises a first storage node group and a second storage node group, the first storage node group comprises R storage nodes that belong to a first data center, the second storage node group comprises R storage nodes that belong to a second data center, and R is an integer greater than 2;

dividing the to-be-stored data into N data slices, and obtaining M check slices of the N data slices, wherein N and M are positive integers, and N+M=R; and separately writing the N data slices and the M check slices into the R storage nodes in the first storage node group and the R storage nodes in the second storage node group.

2. The method according to claim 1, wherein the data storage request further comprises a key, the method further comprising:

determining based on the key, the hash partition to store the to-be-stored data.

3. The method according to claim 1, wherein the hash partition is determined from the first data center and the second data center by a management node in the distributed storage system based on a fault tolerance level of the distributed storage system.

4. The method according to claim 1, further comprising:

writing the N data slices and the M check slices into the R storage nodes in the first storage node group; and copying, into the R storage nodes in the second storage node group, the N data slices and the M check slices that are stored in the R storage nodes in the first storage node group.

5. The method according to claim 4, further comprising:

repairing a slice that fails to be written into a storage node in the first storage node group when a quantity of slices that fail to be written into the first storage node group is less than or equal to M; and copying, into the R storage nodes in the second storage node group, the repaired slice.

6. The method according to claim 4, further comprising: repairing a slice that fails to be copied into the second storage node group when a quantity of slices that fail to be copied into the second storage node group is less than or equal to M.

7. A computing node in a distributed storage system comprising the computing node and a plurality of storage nodes, the computing node comprising:
a communications interface configured to receive a data storage request comprising to-be-stored data; and
a processor coupled to the communications interface and configured to:
determine a hash partition to store the to-be-stored data, divide the to-be-stored data into N data slices, and obtain M check slices of the N data slices, and
separately write the N data slices and the M check slices into R storage nodes in a first storage node group and R storage nodes in a second storage node group, wherein the hash partition comprises the first storage node group and the second storage node group, the first storage node group comprises R storage nodes that belong to a first data center, the second storage node group comprises R storage nodes that belong to a second data center, R is an integer greater than 2, N and M are positive integers, and N+M=R.

8. The computing node according to claim 7, wherein the data storage request further comprises a key, and the processor is further configured to determine, based on the key, the hash partition to store the to-be-stored data.

9. The computing node according to claim 7, wherein the processor is further configured to determine the hash partition from the first data center and the second data center based on a fault tolerance level of the distributed storage system.

10. The computing node according to claim 7, wherein the processor is further configured to:
write the N data slices and the M check slices into the R storage nodes in the first storage node group; and copy, into the R storage nodes in the second storage node group, the N data slices and the M check slices that are stored in the R storage nodes in the first storage node group.

11. The computing node according to claim 10, wherein the processor is further configured to:
repair a slice that fails to be written into a storage node in the first storage node group when a quantity of slices that fail to be written into the first storage node group is less than or equal to M; and
copy, into the R storage nodes in the second storage node group, the repaired slice.

12. The computing node according to claim 10, wherein the processor is further configured to:
repair a slice that fails to be written into the second storage node group when a quantity of slices that fail to be copied into the second storage node group is less than or equal to M.

* * * * *